(12) United States Patent
Zima et al.

(10) Patent No.: US 6,912,860 B2
(45) Date of Patent: Jul. 5, 2005

(54) METHOD OF OPERATING A DIRECTED RELIEF VALVE IN AN AIR CONDITIONING SYSTEM

(75) Inventors: Mark J. Zima, Clarence Center, NY (US); Prasad S. Kadle, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/863,560

(22) Filed: Jun. 8, 2004

(65) Prior Publication Data

US 2005/0028540 A1 Feb. 10, 2005

Related U.S. Application Data

(60) Provisional application No. 60/493,929, filed on Aug. 8, 2003.

(51) Int. Cl.[7] ............................. F25B 45/00; F25B 41/00
(52) U.S. Cl. ............................................. 62/149; 62/129
(58) Field of Search ........................... 62/149, 129, 125, 62/126, 127

(56) References Cited

U.S. PATENT DOCUMENTS

| 4,046,156 A | 9/1977 | Cook | 137/68 A |
| 4,084,602 A | 4/1978 | Cook | 137/68 A |
| 4,409,879 A | 10/1983 | Cobb, Jr. | 89/1 B |

(Continued)

FOREIGN PATENT DOCUMENTS

| JP | 10175426 A | 12/1996 | B60H/1/32 |
| JP | 2000071755 A | 9/1998 | B60H/1/32 |

OTHER PUBLICATIONS

Publication entitled "*An Invesigation of R152a and Hydrocarbon Refrigerants in Mobile Air Conditioning*" by Mahmoud Ghodbane of Delphi Harrison Thermal Systems, printed from SAE International; published in Mar. 1999.

*Primary Examiner*—Chen Wen Jiang
(74) *Attorney, Agent, or Firm*—Patrick M. Griffin

(57) ABSTRACT

A method of operating a directed relief valve (28) for an air conditioning system (10) preferably for a vehicle. The air conditioning system (10) includes a compressor (12), a condenser (16), an expansion device (20), and an evaporator connected to one another by refrigerant lines. The system (10) also includes the directed relief valve (28), which is disposed inline with at least one of the refrigerant lines to ventilate the refrigerant. The directed relief valve (28) includes a detonable squib (36) that explodes in response to a ventilation signal.

A controller (40) generates the ventilation signal in response to a refrigerant leak being detected by a sensor (38). The sensor (38) is preferably located within an air space (27) and adjacent to the evaporator (22). If there is a malfunction of one of a plurality of sensors (38), a partial malfunction message is sent to the operator. If all of the sensors (38) malfunction, the controller (40) also generates the ventilation signal and sends a complete malfunction message to the operator. Predetermined amounts of time may be used between detection and leak signal, leak signal and ventilation signal, and leak signal and message to the operator.

12 Claims, 3 Drawing Sheets

U.S. PATENT DOCUMENTS

| | | | |
|---|---|---|---|
| 4,542,761 A | 9/1985 | Scott | 137/68 A |
| 4,644,755 A | 2/1987 | Esslinger et al. | 62/126 |
| 4,711,096 A | 12/1987 | Krantz | 62/129 |
| 4,821,775 A | 4/1989 | Cooksey | 137/68.2 |
| 4,890,459 A | 1/1990 | Havemann | 62/126 |
| 4,958,503 A | 9/1990 | Thompson | 62/129 |
| 4,967,567 A | 11/1990 | Proctor et al. | 62/127 |
| 5,241,833 A | 9/1993 | Ohkoshi | 62/126 |
| 5,351,037 A * | 9/1994 | Martell et al. | 340/632 |
| 5,443,088 A | 8/1995 | Hoch et al. | 137/68.13 |
| 5,649,429 A | 7/1997 | Schreiber | 62/186 |
| 5,660,051 A | 8/1997 | Sakakibara et al. | 62/133 |
| 5,918,475 A | 7/1999 | Sakakibara et al. | 62/186 |
| 5,983,657 A | 11/1999 | Murata et al. | 62/228.3 |
| 6,085,531 A | 7/2000 | Numoto et al. | 62/149 |
| 6,128,910 A | 10/2000 | Faircloth | 62/129 |
| 6,354,093 B2 | 3/2002 | Davis et al. | 62/89 |
| 6,370,898 B2 | 4/2002 | Yamaguchi et al. | 62/244 |
| 6,625,994 B2 | 9/2003 | Kakehashi et al. | 62/129 |
| 2002/0139128 A1 | 10/2002 | Suzuki et al. | 62/129 |

* cited by examiner

METHOD OF OPERATING A DIRECTED RELIEF VALVE IN AN AIR CONDITIONING SYSTEM

CROSS-REFERENCES TO RELATED APPLICATION

The subject patent application claims priority to and all the benefits of U.S. Provisional Patent Application Ser. No. 60/493,929, which was filed on Aug. 8, 2003.

TECHNICAL FIELD

The subject invention relates to an air conditioning system. Specifically, the invention relates to a directed relief valve for the air conditioning system and an associated method of operating the directed relief valve to ventilate a refrigerant from the system.

BACKGROUND OF THE INVENTION

Air conditioning systems with directed relief valves for ventilating refrigerant are well known in the art. An example is such a system is disclosed in U.S. Pat. No. 6,085,531 (the '531 patent) to Numoto et al.

The '531 patent discloses an air conditioning system utilizing a flammable refrigerant, such as propane. The system includes the standard components of a compressor, a condenser, an expansion device, and an evaporator. The system also includes a sensor to monitor leakage of the refrigerant, particularly in an air space. When a leak is detected, the sensor generates a signal. A discharge electric valve receives the signal and opens the valve in response to the signal, ventilating the refrigerant to the atmosphere. The discharge electric valve is presumably a solenoid-type or electric motor-type valve.

Although the prior art air conditioning system allows for ventilation of a refrigerant to atmosphere in case of a refrigerant leak, there remains an opportunity for an air conditioning system to ventilate the refrigerant from the air conditioning system at a faster rate and with less mechanical complexity than provided by the prior art. Furthermore, there also remains an opportunity for an air conditioning system to ventilate the refrigerant depending on the operating state of refrigerant sensors that sense the refrigerant leak.

SUMMARY OF THE INVENTION

The invention provides an air conditioning system with a compressor operatively connected to a suction line. The compressor compresses a refrigerant into a high-pressure gaseous state. A gas line is operatively connected to the compressor for receiving the refrigerant. A condenser is operatively connected to the gas line for cooling and liquefying the refrigerant. A liquid line is operatively connected to the condenser for receiving the refrigerant and transporting the refrigerant to an expansion device. The expansion device restricts a flow of the refrigerant into an evaporator. The evaporator cools air flowing through the evaporator. The suction line is operatively connected to the evaporator for removing the refrigerant from the evaporator and transporting the refrigerant back to the compressor.

The air conditioning system further comprises a first directed relief valve having an ambient port open to the atmosphere, an inlet for receiving the refrigerant, and an outlet for sending the refrigerant. The directed relief valve is operatively connected inline at the inlet and the outlet to at least one of the lines. A squib is positioned within the directed relief valve to block the inlet and the outlet from the ambient port. The squib is detonable in response to the refrigerant being detected outside of the air conditioning system. The detonation of the squib unblocks the inlet and the outlet from the ambient port for ventilating the refrigerant to the atmosphere.

The subject invention also provides a method of ventilating the air conditioning system. The system includes a sensor for sensing the presence of the refrigerant outside of the air conditioning system. The method includes the step of detecting a malfunction of the sensor and producing a complete malfunction signal. The method also includes the step of initiating an opening in the air conditioning system in response to the complete malfunction signal to allow the refrigerant to flow from the air conditioning system to atmosphere.

Accordingly, the directed relief valve with the detonating squib provides a faster response in ventilating the refrigerant than is available with the electrical valves of the prior art. Further, the directed relief valve of the subject invention provides a simpler mechanical structure and thus is less prone to mechanical failure than that of the prior art. Finally, the air conditioning system of the subject invention includes a method to ventilate the system in case of a malfunction of the sensors.

DESCRIPTION OF THE PREFERRED EMBODIMENT

Figure 1:
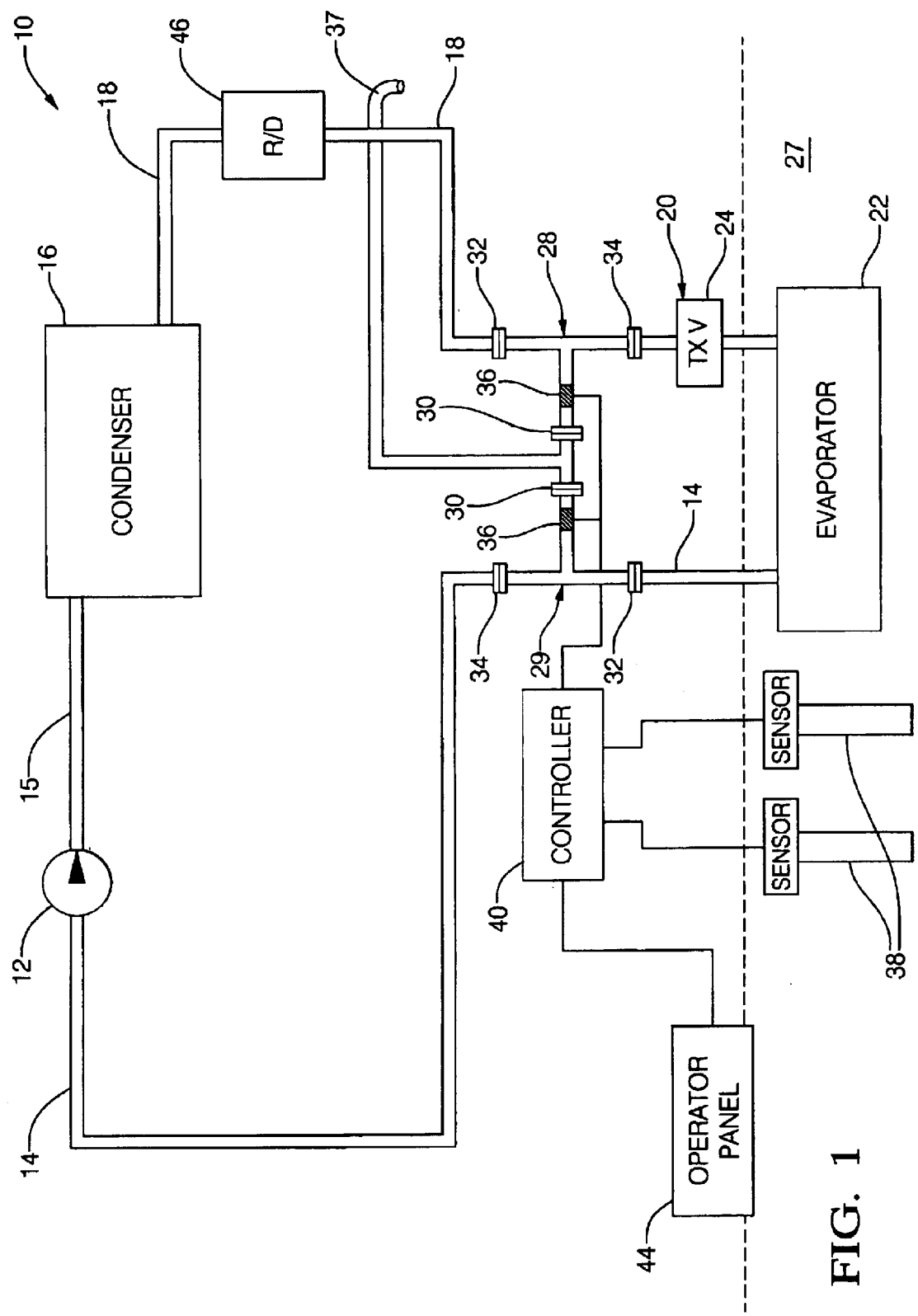
FIG. 1 is a schematic view of a first embodiment of an air conditioning system showing a thermostatic expansion valve implemented as an expansion device.

Referring to the Figures, wherein like numerals indicate like parts throughout the several views, an air conditioning system is shown at 10 in FIG. 1. Preferably, the air conditioning system 10 is located in a vehicle. However, those skilled in the art realize alternatives in which the air conditioning system 10 is implemented into a building, an industrial cooling system, a refrigerator, etc.

The air conditioning system 10 utilizes a refrigerant. The refrigerant is preferably of type R-152a. Those skilled in the art appreciate that other refrigerants could also be employed. These other refrigerants include, but are not limited to R-12/CFC-12, R-134a/HFC-134a, carbon dioxide ($CO_2$), isobutane, and propane.

Figure 2:
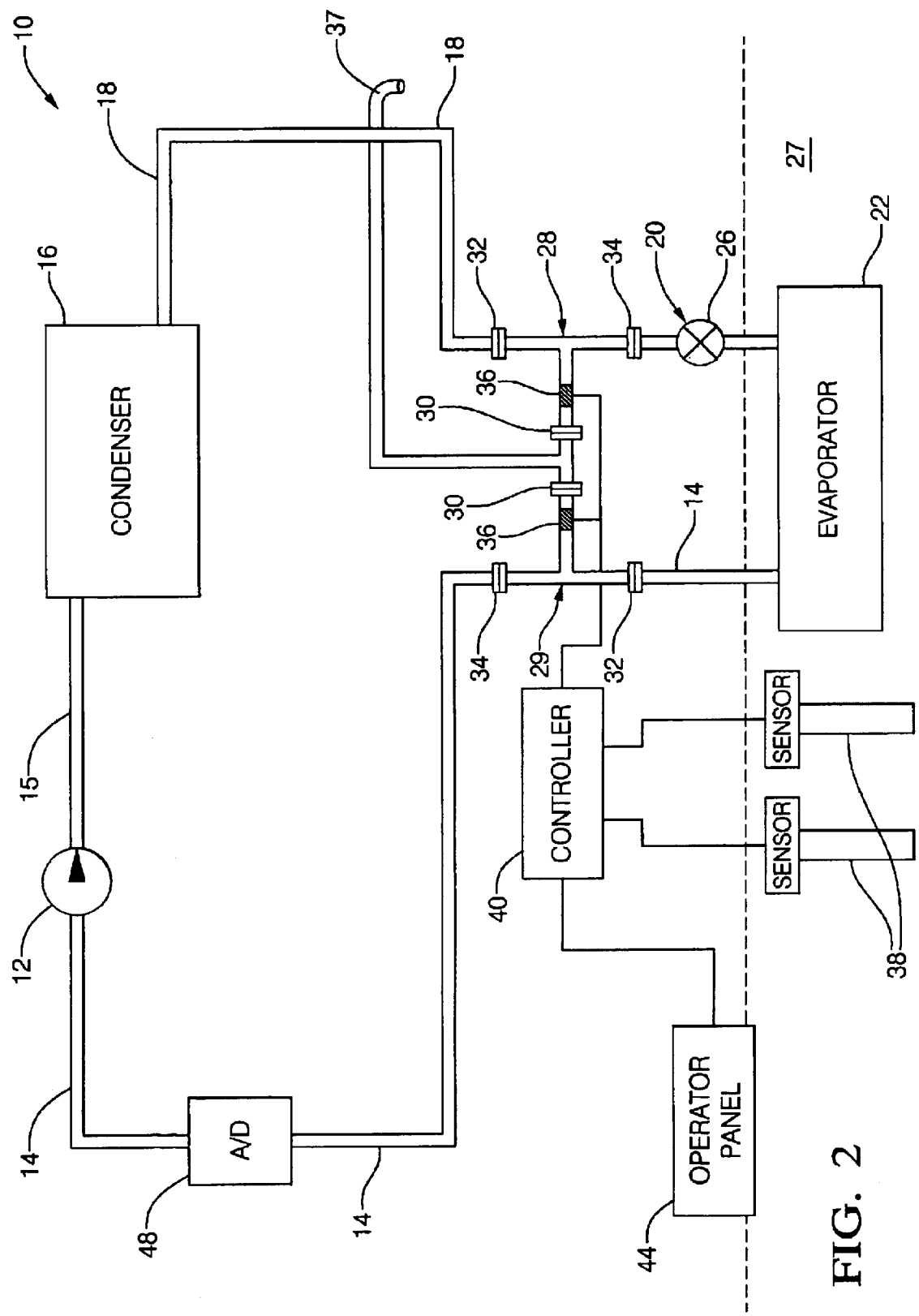
FIG. 2 is a schematic view of a second embodiment of the air conditioning system showing an orifice tube implemented as the expansion device.

A compressor 12 is operatively connected to a suction line 14. The suction line 14 contains the refrigerant in a low pressure, gaseous state. The compressor 12 receives the refrigerant from the suction line 14 and compresses the refrigerant into a high-pressure gaseous state. A gas line 15 is operatively connected to the compressor 12 for receiving the refrigerant and transporting it along in the system 10. A condenser 16 is operatively connected to the gas line 15. The condenser 16 cools and liquefies the refrigerant received from the gas line 15. The condenser 16 dissipates heat removed from the refrigerant to the environment. A liquid line 18 is operatively connected to the condenser 16 for receiving the refrigerant from the condenser 16. An expansion device 20 is operatively connected to the liquid line 18. An evaporator 22 is also operatively connected to the expansion device 20. The expansion device 20 restricts the flow of the refrigerant using the Joules-Thompson effect to significantly cool and lower the pressure of the refrigerant before entering the evaporator 22. In a first embodiment, a thermostatic expansion valve (TXV) 24 performs the function of the expansion device 20. The TXV 24 dynamically regulates the flow of refrigerant into the evaporator 22. In this first embodiment, a receiver/dryer 46 is typically connected in-line with the liquid line 18. In a second embodiment, as shown in FIG. 2, an orifice tube 26 is used as a static, fixed implementation of the expansion device 20. An accumulator/dehydrator 48 is implemented in-line with the suction line 14 in the second embodiment. The evaporator 22 is preferably located within an air space 27 and includes a series of coils. As air flows through the air space 27 and the evaporator 22, it is cooled by heat exchange with the coils of the evaporator 22. The evaporator 22 is also operatively connected to the suction line 14 for sending the now low-pressure, mostly gaseous refrigerant back to the compressor 12.

A first directed relief valve 28 is integrated with the air conditioning system 10 in order to ventilate the refrigerant to the atmosphere. The first directed relief valve 28 includes an ambient port 30 open to the atmosphere. The first directed relief valve 28 also includes an inlet 32 for receiving the refrigerant and an outlet 34 for sending the refrigerant. The inlet 32 and outlet 34 are operatively connected inline to one of the lines, such as the suction line 14, the gas line 15, or the liquid line 18. Additional directed relief valves, such as a second directed relief valve 29, may also be implemented in the system 10. The embodiments shown in FIGS. 1 and 2 illustrate the first directed relief valve 28 in-line with the liquid line 18 and the second directed relief valve 29 in-line with the suction line 14. Those skilled in the art realize that alternate locations and quantities of the directed relief valves are possible. However, for ease of illustration, only the first directed relief valve 28 will be described hereforth.

A squib 36 is positioned within the first directed relief valve 28 to block the inlet 32 and the outlet 34 from the ambient port 30. During normal operation, when no refrigerant is detected outside the system 10, refrigerant enters the inlet 32 and flows out the outlet 34; no refrigerant flows to the ambient port 30. However, in response to the refrigerant being detected outside the air conditioning system 10, the squib 36 detonates and deflagrates, thus unblocking the inlet 32 and the outlet 34 from the ambient port 30. Refrigerant then flows in through the inlet 32 and the outlet 34 to the ambient port 30. The ambient port is preferably connected to a tube 37. The tube 37 leads to a location away from the air space 27 for ventilating the refrigerant to the atmosphere. Experimentation with the air conditioning system 10 has shown that ventilating the refrigerant from the system 10 takes about six to ten seconds. Ventilation of the refrigerant may be required for a number of reasons, including, but not limited to, toxicity caused by the refrigerant.

The air conditioning system 10 also comprises a sensor 38 for detecting refrigerant should a leak occur. The sensor 38 is preferably located in the air space 27, close to the evaporator 22. The sensor 38 senses the refrigerant and produces a sensor signal in response to sensing the refrigerant. Depending on the reliability of the sensor 38, additional sensors 38 may be required. Various types of acceptable sensors 38 are well known to those skilled in the art. These types include, but are not limited to, sensors utilizing infrared light or a heating element.

A controller 40 is electrically connected to the sensor 38 and the squib 36. The controller 40 contains all the necessary electrical and electronic components to perform its function as described herein. These components include, but are not limited to, a power supply, a microprocessor, an analog-to-digital converter, an amplifier, and a relay. The controller 40 receives a sensor signal from the sensor 38. The controller 40 analyzes the sensor signal by comparing a current value of the signal to a lookup table or other set of predetermined values stored within the controller 40. From analyzing the sensor signal, the controller 40 determines whether no refrigerant leak is detected, a refrigerant leak is detected, or the sensor 38 has malfunctioned. In response to the sensor signal indicating that a refrigerant leak is detected, the controller 40 sends a ventilation signal to the squib The squib 36 then initiates an opening by deflagrating, causing the refrigerant to be discharged from the system 10 to the atmosphere.

An operator panel 44 is also electrically connected to the controller 40. The operator panel 44 can be an instrument panel, an electronic display, a speaker, or other similar mechanism to convey messages to an operator of the vehicle. The controller 40 sends a directed relief message to the operator panel 44 in response to the squib 36 being deflagrated. The directed relief message notifies the operator that the air conditioning system 10 is non-functional and must be serviced.

Figure 3A:
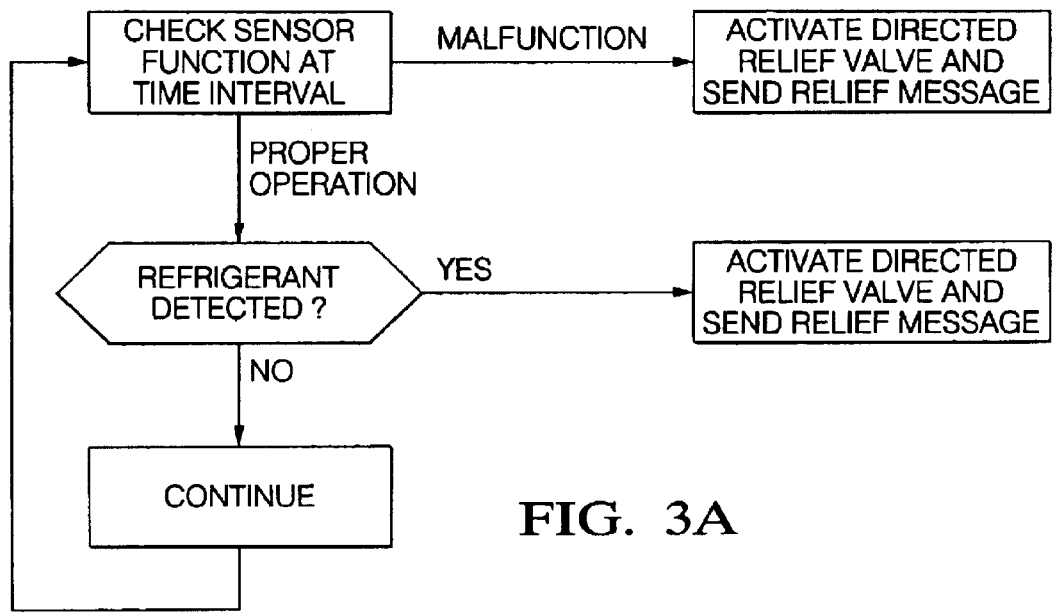
FIG. 3A is a flowchart showing a first algorithm used when a single sensor is implemented with the air conditioning system.
Figure 3B:
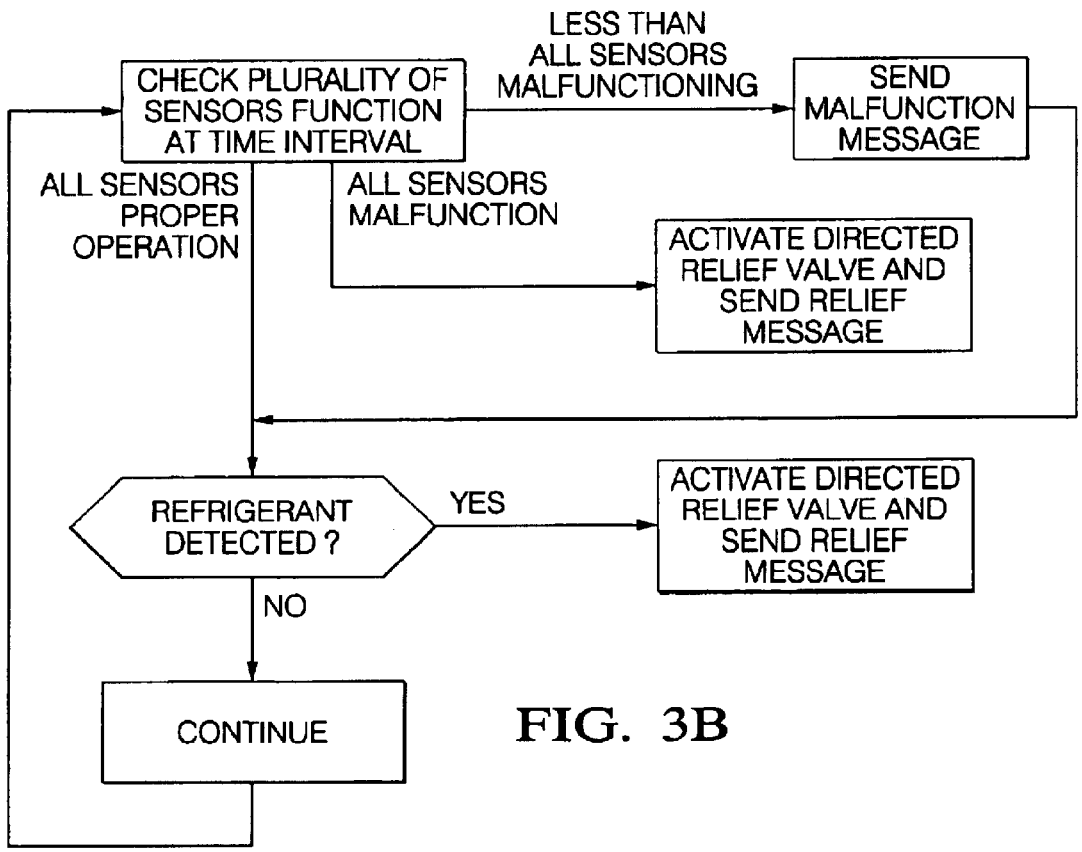
FIG. 3B is a flowchart showing a second algorithm used when a plurality of sensors are implemented with the air conditioning system.

One or more of the sensors 38 may malfunction. As mentioned above, this malfunction is determined by the controller's 40 analysis of the sensor signals. Referring to FIG. 3A, when a single sensor 38 is utilized, the controller 40 sends the ventilation signal to the squib 36 upon detection of a malfunction to activate the directed pressure relief valve 28, 29. When a plurality of sensors 38 are utilized, as shown in FIG. 3B, the controller 40 sends the ventilation signal to the squib only in response to all of the plurality of sensors 38 indicating a malfunction. In the event that less than all of the plurality of sensors 38 show a malfunction, the ventilation signal will not be sent. However, a partial malfunction message will be sent to the operator panel 44 to notify the operator to have the air conditioning system 10 serviced.

A time delay before ventilating the refrigerant may also be implemented in the system 10. A predetermined amount of time could be set depending on various system 10 factors including type of refrigerant used, an amount of leaking refrigerant detected, location of the leak, location of the air conditioning system 10, etc. The delay includes waiting a first predetermined amount of time between detecting the malfunction of the sensor 38 or sensors 38 and producing the complete malfunction signal. The delay includes waiting a second predetermined amount of time between detecting the presence of refrigerant and producing the leak signal. Of course, the predetermined amount of time could be set to zero when no time delay is desired. Further, the time delay may be effectively implemented at another point in the operation of the system 10, such as after the production of the complete malfunction or leak signals and before the initiation of the opening.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of ventilating an air conditioning system (10) having a sensor (38) for sensing the presence of the refrigerant outside of the air conditioning system (10), said method comprising the steps of:
   detecting a malfunction of the sensor (38) and producing a complete malfunction signal; and
   initiating an opening in the air conditioning system (10) in response to the complete malfunction signal to allow the refrigerant to flow from the air conditioning system (10) to atmosphere.

2. A method of ventilating an air conditioning system (10) as set forth in claim 1 further comprising the step of sending a directed relief message to an operator of the air conditioning system (10) in response to at least one of said step of detecting a malfunction of the sensor (38) or said step of initiating the opening.

3. A method of ventilating an air conditioning system (10) as set forth in claim 1 wherein said sensor (38) is further defined as a plurality of sensors (38) and further comprising the step of detecting a malfunction of all of the plurality of sensors (38) and producing the complete malfunction signal.

4. A method of ventilating an air conditioning system (10) as set forth in claim 3 further comprising the step of waiting a first predetermined amount of time between detecting a malfunction of all of the plurality of sensors (38) and producing the complete malfunction signal.

5. A method of ventilating an air conditioning system (10) as set forth in claim 1 wherein said sensor (38) is further defined as a plurality of sensors (38) and further comprising the step of detecting a malfunction of less than all of the plurality of sensors (38) and producing a partial malfunction signal.

6. A method of ventilating an air conditioning system (10) as set forth in claim 5 further comprising the step of sending a malfunction message to an operator of the air conditioning system (10) in response to the partial malfunction signal.

7. A method of ventilating an air conditioning system (10) as set forth in claim 1 further comprising the step of sensing the presence of the refrigerant outside of the air conditioning system (10) with the at least one sensor (38) and producing a leak signal.

8. A method of ventilating an air conditioning system (10) as set forth in claim 7 further comprising the step of initiating the opening in the air conditioning system (10) in response to the leak signal to allow the refrigerant to flow from the air conditioning system (10) to atmosphere.

9. A method of ventilating an air conditioning system (10) as set forth in claim 8 further comprising the step of sending a directed relief message to an operator of the air conditioning system (10) in response to at least one of said step of sensing the presence of the refrigerant or said step of initiating the opening.

10. A method of ventilating an air conditioning system (10) as set forth in claim 7 further comprising the step of waiting a second predetermined amount of time between sensing the presence of the refrigerant outside of the air conditioning system (10) and producing the leak signal.

11. A method of ventilating an air conditioning system (10) as set forth in claim 1 wherein said step of initiating an opening in the air conditioning system (10) is further defined as the step of deflagrating a squib (36) to produce the opening in the air conditioning system (10).

12. A method of ventilating an air conditioning system (10) as set forth in claim 1 further comprising the step of waiting a first predetermined amount of time between detecting the malfunction of the sensor (38) and producing the complete malfunction signal.

* * * * *